Patented July 2, 1940

2,206,574

UNITED STATES PATENT OFFICE 2,206,574

CONCENTRATION OF ORES AND OTHER MINERALS BY THE SINK AND FLOAT PROCESS

Andrew Pearson, Sevenoaks, England

No Drawing. Application October 7, 1938, Serial No. 233,745. In Great Britain October 15, 1937

9 Claims. (Cl. 209—173)

This invention relates to the concentration of ores and other minerals by the sink and float process, and more particularly to the production of stable heavy suspensions for use in said process.

As is known, materials such as coal and ores consisting of mixtures of various minerals of different specific gravity can be separated into their lighter and heavier component parts by immersion in a bath containing a medium having a specific gravity greater than that of the lighter component of the material to be treated and less than that of the heavier component, the result being that the heavier component will sink through the medium and the lighter component float.

Such a medium may consist of a homogeneous liquid of suitable specific gravity or it may be a suspension in water or other liquid of a substance heavy enough to permit the suspension attaining the necessary specific gravity. Many such substances have been used or suggested, to produce suspensions of the necessary specific gravity, examples being barytes, galena, iron oxide and the like.

However, in addition to the specific gravity of the medium thus produced, the viscosity and stability thereof must also be controlled, since it has been found that a suspension of the correct specific gravity made by the dispersion of one substance alone in water or other liquids may not have the necessary stability and will settle out into its component phases at a rate much too rapid to permit of its practical use. Also, as is further explained hereafter, too great viscosity of the medium is detrimental.

To obtain the necessary stability it has been the custom as in coal concentration, where a suspension of barytes in water is employed, to add a dispersing agent or emulsifier to the suspension which will have the effect of reducing the settling rate. Such addition however, has at the same time the effect of increasing the viscosity, this increase in viscosity being detrimental to the efficiency of the concentration process in so far as it introduces increased resistance to free settling under gravity alone, of the sink portion within the separating medium.

The present invention aims at obviating the foregoing drawback, and at providing a method whereby the stability of the suspension can be assured, with, at the same time, the lowest increase in viscosity.

It is known that a suspension will tend to separate out into its component phases unless at least one of certain conditions are fulfilled.

These conditions are:

(a) The specific gravity of the dispersed and continuous phases must be equal.

(b) The particles of the dispersed phase must be in Brownian movement.

(c) The viscosity of the continuous phase must be high enough to prevent settling of the dispersed phase.

It has not been found practical to obtain stability by adhering to condition (a). The dispersed phase of the suspensions under consideration consist of finely ground heavy substances and the continuous phase is water and no soluble salts are known which would in aqueous solution yield a specific gravity equal to that of the dispersed phase. Some chlorides have been tried, but these have had the effect of causing flocculation by the release of ions in the suspensions.

It has been found that to conform with condition (b), i. e., if a suspension was produced at the necessary specific gravity, in which all particles of the dispersed phase were in Brownian movement, the viscosity of the suspension would prove too high to enable the resulting medium to be used for the sink and float method.

Similarly with regard to condition (c) it is not practical to increase the viscosity of the aqueous external phase to the point necessary entirely to prevent settling out of the dispersed phase.

It has been ascertained in accordance with the present invention that by increasing the proportion of particles in Brownian movement in the dispersed phase an increase in the viscosity and specific gravity of the stabilised portion of the suspension is effected which reacts favourably on the settling out rate of the suspension as a whole, and that when preparing suspensions for the concentration of ores and other minerals by the sink and float process the suspensions used as separating medium are most easily stabilised by approaching conditions (b) and (c).

More specifically, the present invention provides for producing stability at the desired specific gravity of said separating media by producing and adjusting, during use, the necessary proportion of particles in Brownian movement or approaching Brownian movement size, to the coarser particles within the medium at the point giving the requisite viscosity for practical purposes. The invention accordingly comprises the production of an improved separating medium and methods, and steps thereof, of preparing such medium, reconditioning the same in use, and separating ores or other materials, involving the use of such medium.

The invention is based on a number of ascertained effects which may briefly be stated as follows:

The viscosity of a colloidal suspension, or suspension of particles of Brownian movement size, of the type contemplated herein, is dependent on the particle sizes, the medium, generally speaking, becoming more viscous as the fineness of the particles increases. With a sufficient portion of extremely fine particles, the viscosity and carrying capacity of the suspension will be great enough to carry and hold up in suspension a certain proportion of coarser grained particles, this effect being obtainable, within the range of sizes mentioned herein, without the use of a dispersing or deflocculating agent. Further a desired relation between viscosity and specific gravity in the separating medium may be obtained by a proper proportioning of the particle sizes. If too much of the suspended matter is extremely fine, the viscosity of the medium will be too great, since for practical purposes there will be too great resistance to free settling, under gravity alone, of the sink portion of the material being separated. The permissible maximum viscosity of the medium for any separating operation can be readily ascertained. Therefore, according to the present invention, the required specific gravity and viscosity of the medium, for a given separating operation, being known, the proportion of fine and relatively coarse particles is adjusted, the viscosity being chiefly produced by the fine particles, and the specific gravity brought up to the desired point by the addition of enough relatively coarse particles. It will be observed that the carrying capacity of the colloidal or Brownian movement suspension, at a viscosity which is practical for the separation process, must be such as to carry the proportion of coarser particles required to raise the specific gravity to the required amount.

Arising out of the above considerations, the following further observations may be made. Suspension media may be produced of various densities within the practical range required in the treatment of minerals. The specific gravity of the solids which are to be employed in the suspension, and the desired specific gravity of the medium produced influence the amount and size of the selected relatively coarse particles. Such size and amount in turn determine the size and amount of the relatively fine particles which are to be chosen to provide the carrying power for such coarser particles. The range of sizes of particles intermediate the two groups above mentioned will of course be determined by the above considerations.

It is further remarked that the viscosity of the medium, prepared as above, may not remain constant in use, but may increase to a harmful extent. This may be due, with suspensions of galena, for example, to attrition of the larger particles, producing some approaching Brownian movement size, and to picking up fine particles from the material which is being separated. According to the present invention, this condition is adjusted and corrected during the use of the separating medium, by withdrawing a sufficient proportion of the intermediate size particles and bringing up the specific gravity to the desired figure by adding enough of the larger particle size. The intermediates, rather than colloidal size particles, are withdrawn, because a sufficient decrease in viscosity can be produced by the withdrawal of the intermediates, and a withdrawal of colloidal size particles would result in the suspension becoming unstable and a considerable amount of precipitation. This difficulty can conveniently be avoided by the removal or elimination of all of certain intermediate sizes, as determined to be necessary, and the operation may be carried out by withdrawing part of the circulating suspension from the separating vessel, treating it by the removal or elimination of intermediates and the addition of coarser particles, after which it may be returned to the separating vessel.

One method of carrying the invention into practical effect to prepare a suspension for use, according to the present invention consists in preparing for example, a stable suspension of very finely levigated galena and water in which the proportion of particles in Brownian movement is relatively large, and in adding to said suspension galena of coarser grain size until the requisite final specific gravity is obtained.

The following examples illustrate the effect of the adjustment of the proportion of fine to coarse particles in acordance with the present invention on the stability of the resulting suspensions.

(a) An aqueous suspension having a density of 2.80, was prepared from galena, all the particles of which were smaller than 1500 mesh. This suspension settled at the following rates:

*Amount of supernatant liquor*

|  | Cc. |
|---|---|
| After 10 minutes | 1 |
| After 20 minutes | 5 |
| After 30 minutes | 7 |
| After 40 minutes | 9 |
| After 50 minutes | 11 |
| After 60 minutes | 13 |

(b) An aqueous suspension having the same density of 2.80 was prepared from galena, the particles of which were graded as follows:

|  | Per cent |
|---|---|
| Over 800 mesh | 47.4 |
| Between 800 and 1500 mesh | 32.0 |
| Smaller than 1500 mesh | 20.6 |

This suspension settled at the following rate:

*Amount of supernatant liquor*

|  | Cc. |
|---|---|
| After 10 minutes | 15 |
| After 20 minutes | 27 |
| After 30 minutes | 33 |
| After 40 minutes | 34 |
| After 50 minutes | 34 |
| After 60 minutes | 34 |

It will be seen from the above that the suspension of very fine particles is much more stable than that of the same density composed largely of larger size particles.

The effect of the grading in accordance with the present invention on the viscosity of the suspensions may be seen from the following:

(c) Aqueous galena suspension in accordance with the present invention, 75% of the dispersed phase of which has a particle size larger than 400 mesh, the remaining 25% being smaller than 1500 mesh.
Viscosity 1.34
Density 2.80

(d) Aqueous galena suspension in which all the dispersed phase has a particle size smaller than 1500 mesh.
Viscosity 2.00
Density 2.80

The above indicates the manner in which the viscosity can be kept down by suitably grading the particle sizes, while holding the density constant.

The control of the viscosity of such stabilised suspensions can be effected during use by the removal of that portion of the dispersed phase which is smaller in size than the point at which rapid settlement takes place, but yet is larger than Brownian size, i. e. generally between 400 and 1000 I. M. M. mesh, or between about 37 and 17 microns; and the specific gravity can be retained unchanged by the addition of the equivalent weight of larger particle size of the heavy substance only which forms the basis of the suspension.

The removal of the portion mentioned above can be effected by various well-known means, for example, by gravity separation in a classifier either of the hydraulic or the rake type, or if the portion mentioned above consists mainly of entrained foreign matter, by means of froth flotation. In practice, the intermediate sizes of particles referred to may be removed by taking used suspension from the separating vessel and passing it to a classifier, from which all fine and intermediate sized particles overflow, while the coarser sized particles do not. The intermediate sizes may then be separated from the fine by further similar classification; or, in more usual practice, the suspension from the separating vessel may be passed to a single classifier which is in closed circuit with a ball mill. All the fine and intermediate sized particles overflow from the classifier and pass to the ball mill, which grinds down the intermediate sized particles to fine size, thus removing or eliminating the intermediates, as stated, the use of a ball mill with a classifier whenever required, being common procedure. The froth flotation referred to above is only for the removal of entrained foreign matter, if any there be, as is well known.

It will be noted that one example of a suspension prepared in accordance with my invention is as given in Example (c) above, to wit, an aqueous galena suspension in which 75% of the dispersed phase has a particle size larger than 400 mesh, the remaining 25% being smaller than 1500 mesh, this suspension being one of sufficient stability and suitable viscosity and density.

For the purposes of definition, and by reference to specific indications in the foregoing specification, the following may be noted: Generally speaking, the fine particles, upon which viscosity and carrying power for the coarser particles chiefly depends, will be required in a proportion of about twenty-five per cent and upwards of the total particles in the suspension, the upper limit of this proportion being determined, as will be obvious, by the permissive working viscosity of the dispersion. The particles of coarser grain size, which are added to obtain the requisite final specific gravity, may be said to be of a size which is about 600 I. M. M. mesh and upwards larger than the fine particles, the upper limit of size of these larger particles obviously being the point at which substantial settling thereof from the dispersion of fine and relatively coarse particles occurs. This may readily be determined in practice by test. It may be said that the limit in respect to the coarsest particles permissible is about 200 or 150 mesh.

I claim:

1. For use in the sink and float process of concentrating ores and the like, a heavy separating medium having a density of at least 2.5, which is substantially stable when in a quiescent condition, in the absence of a deflocculating agent, said medium consisting of a dispersion of fine and coarse particles of mineral substance in a liquid, said fine particles making up at least twenty-five per cent by weight of all said particles and including no particle which is larger than one selected from the range 1000 to 1500 mesh, said coarse particles being at least twice the size of the largest fine particles, and being smaller than 100 mesh, and the said medium being substantially free from particles intermediate in size between the fine and coarse particles.

2. For use in the sink and float process of concentrating ores and the like, a heavy separating medium having a density of at least 2.5 which is substantially stable when in a quiescent condition, in the absence of a dispersing agent, said medium comprising a dispersion of fine and coarsely comminuted particles of mineral substance in a liquid, said fine particles being of sizes within and approaching Brownian movement range and not exceeding 1000 mesh, and the difference between the numerical values designating the maximum size of the fine particles and the minimum size of the coarse particles in terms of mesh sizes being at least 600, the fine particles comprising at least twenty-five per cent of the whole, the remainder being coarse particles smaller than 100 mesh, and the said medium being substantially free from particles intermediate in size between the fine and coarse particles.

3. For use in the sink and float process of concentrating ores and the like, a heavy separating medium which is substantially stable when in a quiescent condition in the absence of a dispersing agent, said medium comprising a dispersion of artificially comminuted and sized particles of galena in water, said particles falling within two size ranges, the particles of the smaller size being of colloidal type less than 1000 mesh and the particles of the largest size being at least twice the size of the largest colloidal type particles and smaller than 100 mesh, said medium being substantially free from particles of intermediate size, and said smaller particles comprising at least twenty-five per cent of all the particles by weight.

4. A composition for use in the sink and float method of classifying materials comprising an aqueous dispersion having a density of at least 2.5 and containing particles of insoluble mineral substance of which at least twenty-five per cent by weight are relatively fine, the largest of said fine particles having a diameter of less than seventeen microns; and substantially all of the remaining particles being relatively coarse but smaller than 100 mesh, the smallest of said coarse particles being at least approximately twice the size of the largest of said fine particles.

5. The method of preparing a heavy separating medium having a density of at least 2.5 and substantially stable when in quiescent condition in the absence of a deflocculating agent, which consists in preparing a suspension of colloidal type particles of an insoluble mineral substance in water, said particles not exceeding seventeen microns in size, in adding to said suspension material which consists substantially exclusively of coarse particles of said substance, the minimum size of the coarse particles being at least twice as large as the maximum size of the colloidal particles, said coarse particles being not more than one hundred forty-seven microns in size, the amount of the colloidal particles being equal to at least twenty-five per cent by weight of all the said particles, and in regulating the proportion between the colloidal particles and coarse particles in accordance with the desired viscosity and density.

6. The method of preparing a heavy separating medium having a density of at least 2.5 and substantially stable when in quiescent condition in the absence of a deflocculating agent, which consists in sizing a finely levigated metallic ore to produce particles falling into two size ranges separated by an intermediate range which is eliminated, the smaller size range extending from Brownian movement size up to seventeen microns, the smallest particles of the larger size range being at least twice as large as the largest particles of the smaller size range and the size of the largest particles being less than one hundred forty-seven microns, preparing a suspension by adding particles of the smaller size range to water, adding to said suspension particles of the larger size range in sufficient quantity to raise the density to the desired point, and regulating the proportion of small particles to an amount, not less than twenty-five per cent by weight, which will produce the viscosity required to stabilize the suspension while not exceeding the maximum permissible value.

7. The method of making a low viscosity heavy suspension medium adapted for use without agitation in the gravitational separation of ores and the like, which consists in raising the specific gravity of water by a dispersion therein of both coarse and extremely fine particles of galena, the coarse particles being larger than 400 mesh and smaller than 100 mesh and the fine particles being smaller than 1000 mesh, said dispersion being substantially free from particles of intermediate size, and in regulating the proportion of fine particles to an amount, not less than twenty-five per cent of the whole by weight, which will provide the viscosity necessary to maintain the coarse particles in suspension without exceeding the maximum permissible value of viscosity.

8. A method of preparing and controlling a medium for use in ore flotation, comprising admixing at least twenty-five per cent by weight of relatively fine particles of a certain metallic salt the largest of which has a diameter of less than seventeen microns with a remainder substantially made up of relatively coarse particles of the same salt the smallest of which is at least approximately twice the size of the largest of said fine particles, dispersing said particles in water, withdrawing from the dispersion thus formed, particles intermediate the sizes of said fine and coarse particles and replacing such intermediate particles with an equal weight of coarse particles.

9. The method of concentrating ores and other minerals by the sink and float process, which consists in preparing a liquid separating medium which is substantially stable when in quiescent condition, said medium containing a dispersion of colloidal type particles not exceeding seventeen microns in size and relatively coarse particles of the same substance, the latter being at least twice the size of the largest colloidal type particles but smaller than one hundred forty-seven microns, said dispersion including at least twenty-five per cent of colloidal type particles by weight and sufficient coarse particles to raise the density to the required point depending on the respective densities of the components to be separated, supplying ore or other mineral material to said medium, separately removing the sink and float components, and preventing undesirable increase in the viscosity of the medium during the concentration process while maintaining the density of said medium by removing therefrom particles which are intermediate in size between said colloidal and coarse particles and replacing the same by an equivalent weight of coarse particles.

ANDREW PEARSON.